(12) United States Patent
Park et al.

(10) Patent No.: US 11,845,320 B2
(45) Date of Patent: Dec. 19, 2023

(54) APPARATUS AND METHOD FOR CONTROLLING AIR CONDITIONING OF VEHICLE

(71) Applicants: HYUNDAI MOTOR COMPANY, Seoul (KR); Kia Corporation, Seoul (KR)

(72) Inventors: Se Jun Park, Suwon-si (KR); Jong Hyuck Kim, Hwaseong-si (KR); Gyoung Wan Koo, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/721,845

(22) Filed: Apr. 15, 2022

(65) Prior Publication Data

US 2023/0059073 A1 Feb. 23, 2023

(30) Foreign Application Priority Data

Aug. 23, 2021 (KR) .......................... 10-2021-0111182

(51) Int. Cl.
*B60H 1/00* (2006.01)

(52) U.S. Cl.
CPC ................................ *B60H 1/00671* (2013.01)

(58) Field of Classification Search
CPC ............ B60H 1/00671; B60H 1/00742; B60H 1/00764; B60H 1/00828; B60H 1/00835; B60H 1/00849
See application file for complete search history.

(56) References Cited

U.S. PATENT DOCUMENTS

2004/0259493 A1* 12/2004 Valley .................... B60H 1/248
454/164
2018/0009290 A1* 1/2018 Inui ........................ F25B 47/006

* cited by examiner

*Primary Examiner* — Marc E Norman
(74) *Attorney, Agent, or Firm* — MORGAN, LEWIS & BOCKIUS LLP

(57) ABSTRACT

An air conditioning control apparatus for a vehicle according to the present disclosure includes a sensor that senses a number of vehicle occupants, a vehicle speed, and an indoor temperature and an outdoor temperature of the vehicle, an air conditioner that adjusts an amount of air introduced from an outside or exhausted to the outside, and a controller that controls the air conditioner based on the number of vehicle occupants, the vehicle speed, and the indoor temperature and the outdoor temperature of the vehicle. According to the present embodiment, the comfort inside the vehicle may be improved by adjusting the ventilation amount depending on the number of vehicle occupants, the vehicle speed, and the indoor temperature and the outdoor temperature of the vehicle.

12 Claims, 6 Drawing Sheets

APPARATUS AND METHOD FOR CONTROLLING AIR CONDITIONING OF VEHICLE

CROSS-REFERENCE TO RELATED APPLICATION

This application is based on and claims the benefit of priority to Korean Patent Application No. 10-2021-0111182, filed on Aug. 23, 2021, in the Korean Intellectual Property Office, the entire contents of which are incorporated herein by reference.

TECHNICAL FIELD

The present disclosure relates to an air conditioning control apparatus for a vehicle and a method thereof.

BACKGROUND

Air conditioners may control an amount of air flowing in from the outside of the vehicle and air circulation inside the vehicle, so that temperature, humidity, cleanliness, and flow of the air inside the vehicle may be maintained comfortably. In general, typical air conditioners operate according to a preset target temperature. Accordingly, there is a limitation that various needs of users cannot be satisfied.

SUMMARY

The present disclosure has been made to solve the above-mentioned problems occurring in the prior art while maintaining the advantages achieved by the prior art.

An aspect of the present disclosure provides an air conditioning control apparatus and an air conditioning control method for the vehicle capable of improving comfort inside a vehicle by adjusting the ventilation amount depending on the number of vehicle occupants, the vehicle speed, and the indoor temperature and the outdoor temperature of the vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an air conditioning control apparatus for a vehicle includes a sensor that senses a number of vehicle occupants, a vehicle speed, and an indoor temperature and an outdoor temperature of the vehicle, an air conditioner that adjusts an amount of external air introduced from an outside of the vehicle or air exhausted to the outside of the vehicle, and a controller that controls the air conditioner based on the number of vehicle occupants, the vehicle speed, and the indoor temperature and the outdoor temperature of the vehicle.

In an embodiment, the air conditioner may include an intake door that adjusts a vehicle internal inflow amount of the external air and internal circulation air circulated inside the vehicle, a blower motor that moves the external air into the vehicle or moves the internal circulation air back into the vehicle, and a rear fan that exhausts air inside the vehicle to the outside of the vehicle.

In an embodiment, the controller may determine the number of vehicle occupants and the vehicle speed, when it is determined that the indoor temperature of the vehicle is less than the outdoor temperature of the vehicle.

In an embodiment, the controller may allow the intake door to increase the amount of the external air, when the number of vehicle occupants is a first number of occupants exceeding at least one, and the vehicle speed exceeds a first speed.

In an embodiment, the controller may allow the intake door to increase the amount of the external air, and may increase a speed of the blower motor, when the number of vehicle occupants is a first number of occupants exceeding at least one, and the vehicle speed does not exceed a first speed.

In an embodiment, the controller may allow the intake door to increase the amount of the external air, may increase the speed of the blower motor, and may control a speed of the rear fan at a first reference speed, when the number of vehicle occupants is a second number of occupants greater than the first number of occupants, and the vehicle speed does not exceed a second speed faster than the first speed.

In an embodiment, the controller may allow the intake door to increase the amount of the external air, may increase the speed of the blower motor, and may control the speed of the rear fan at a second reference speed faster than the first reference speed, when the number of vehicle occupants exceeds the second number of occupants.

According to an aspect of the present disclosure, a method of controlling an air conditioning in a vehicle includes sensing, by a sensor, a number of vehicle occupants, a vehicle speed, and an indoor temperature and an outdoor temperature of the vehicle, controlling, by a controller, an air conditioner which adjusts an amount of external air introduced from an outside of the vehicle or air exhausted to the outside of the vehicle, based on the number of vehicle occupants, the vehicle speed, and the indoor temperature and the outdoor temperature of the vehicle.

In an embodiment, the air conditioner may include an intake door that adjusts a vehicle internal inflow amount of the external air and internal circulation air circulated inside the vehicle, a blower motor that moves the external air into the vehicle or moves the internal circulation air back into the vehicle, and a rear fan that exhausts air inside the vehicle to the outside of the vehicle.

In an embodiment, the method of controlling an air conditioning may further include determining, by the controller, whether the indoor temperature of the vehicle is less than the outdoor temperature of the vehicle, determining, by the controller, the number of vehicle occupants, and determining, by the controller, the vehicle speed.

In an embodiment, the controlling of the air conditioner may include allowing the intake door to increase the amount of the external air, when the number of vehicle occupants is a first number of occupants exceeding at least one, and the vehicle speed exceeds a first speed.

In an embodiment, the controlling of the air conditioner may include allowing the intake door to increase the amount of the external air, and increasing a speed of the blower motor, when the number of vehicle occupants is a first number of occupants exceeding at least one, and the vehicle speed does not exceed a first speed.

In an embodiment, the controlling of the air conditioner may include allowing the intake door to increase the amount of the external air, increasing the speed of the blower motor, and controlling a speed of the rear fan at a first reference speed, when the number of vehicle occupants is a second number of occupants greater than the first number of occupants, and the vehicle speed does not exceed a second speed faster than the first speed.

In an embodiment, the controlling of the air conditioner may include allowing the intake door to increase the amount of the external air, increasing the speed of the blower motor, and controlling the speed of the rear fan at a second reference speed faster than the first reference speed, when the number of vehicle occupants exceeds the second number of occupants.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
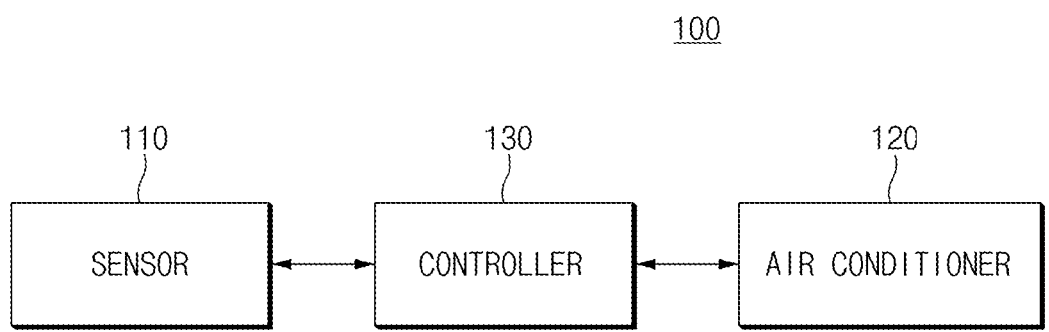
FIG. 1 is a configuration diagram illustrating an air conditioning control apparatus for a vehicle according to an embodiment of the present disclosure.

Hereinafter, some embodiments of the present disclosure will be described in detail with reference to the example drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions may not be provided in order not to unnecessarily obscure the gist of the present disclosure.

In describing the components of the embodiment according to the present disclosure, terms such as "first," "second," "A", "B", "(a)," "(b)," and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a configuration diagram illustrating an air conditioning control apparatus for a vehicle according to an embodiment of the present disclosure.

As illustrated in FIG. 1, an air conditioning control apparatus 100 for a vehicle may include a sensor 110, an air conditioner 120, and a controller 130.

The sensor 110 may sense the number of vehicle occupants, a vehicle speed, and an indoor temperature and an outdoor temperature of the vehicle. According to an embodiment, the sensor 110 may include a seat sensor, an image sensor, an infrared sensor, and the like, and may sense the number of vehicle occupants using the same. In addition, the sensor 110 may include a vehicle speed sensor, a wheel sensor, and the like, and may sense the vehicle speed using the same. In addition, the sensor 110 may include a temperature sensor, and may sense the indoor temperature and the outdoor temperature of the vehicle using the same.

The air conditioner 120 may include an intake door that adjusts a vehicle internal inflow amount of external air introduced from the outside and internal circulation air circulated inside the vehicle, a blower motor that moves the external air introduced from the outside into the vehicle or moves the internal circulation air back into the vehicle, and a rear fan that exhausts air inside the vehicle to the outside of the vehicle. A more detailed description will be described with reference to FIGS. 2 to 4.

Figure 2:
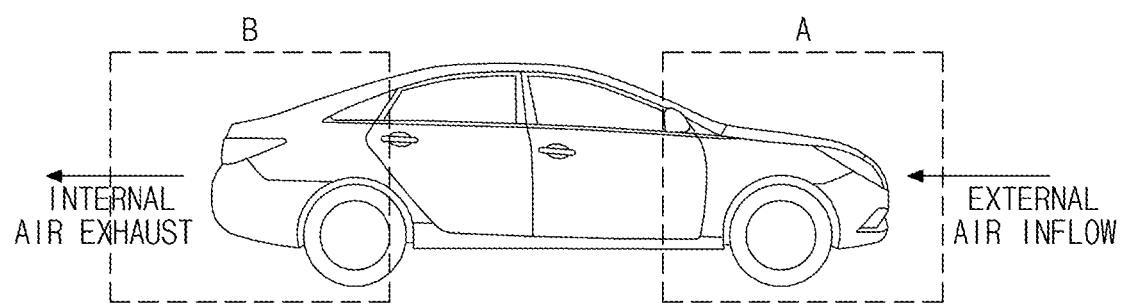
FIG. 2 is a diagram schematically illustrating a flow of air introduced into and exhausted from a vehicle.
Figure 3:
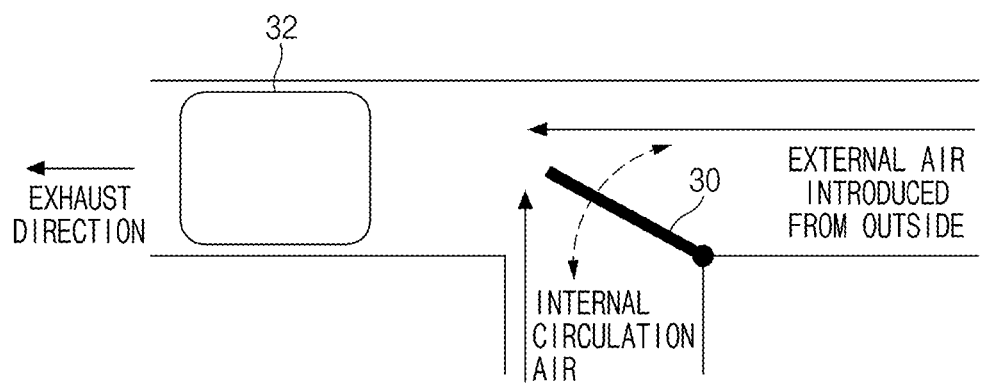
FIG. 3 is a diagram schematically illustrating an intake door that adjusts internal circulation air and external air of a vehicle according to an embodiment of the present disclosure.
Figure 4:
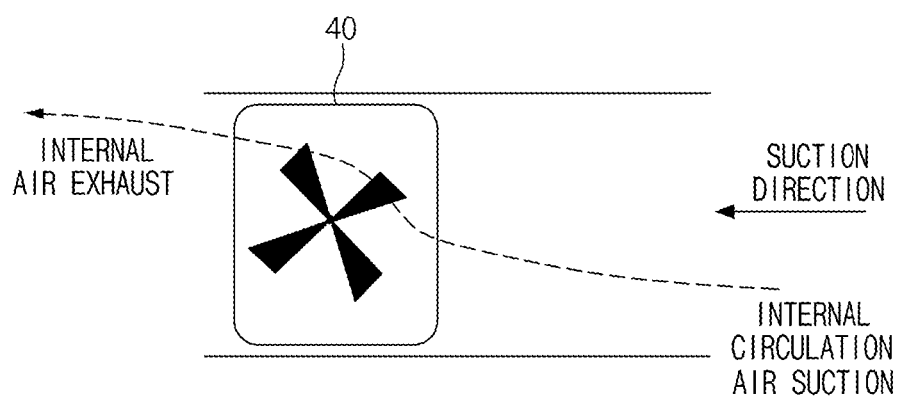
FIG. 4 is a diagram schematically illustrating a rear fan that is mounted to exhaust internal air of a vehicle from a rear of the vehicle according to an embodiment of the present disclosure.

FIG. 2 is a diagram schematically illustrating a flow of air introduced into and exhausted from a vehicle. FIG. 3 is a diagram schematically illustrating an intake door that adjusts internal circulation air and external air of a vehicle according to an embodiment of the present disclosure. FIG. 4 is a diagram schematically illustrating a rear fan that is mounted to exhaust internal air of a vehicle from a rear of the vehicle according to an embodiment of the present disclosure.

As illustrated in FIG. 2, external air may be introduced into a front side 'A' of the vehicle, and internal air may be exhausted from a rear side 'B' of the vehicle.

As illustrated in FIG. 3, an intake door 30 and a blower motor 32 may be located in the front side ('A' in FIG. 2) of the vehicle.

The intake door 30 may be rotated according to an internal air mode and an external air mode of the vehicle to adjust a vehicle internal inflow amount of the external air introduced from the outside and internal circulation air. When the intake door 30 is controlled in the external air mode, the intake door 30 rotates to open a flow passage of the external air introduced from the outside of the vehicle, so that an amount of the external air flowing into the vehicle increases, and an amount of the internal circulation air flowing into the vehicle decreases. Accordingly, it is possible to increase the amount of the external air flowing into the vehicle than the amount of the internal circulation air flowing into the vehicle.

In contrast, when the intake door 30 is controlled in the internal air mode, the intake door 30 rotates to open a flow passage of the internal circulation air, so that an amount of the external air flowing into the vehicle decreases, and an amount of the internal circulation air flowing into the vehicle increases. Accordingly, it is possible to increase the amount of the internal circulation air flowing into the vehicle than the amount of the external air flowing into the vehicle.

The blower motor 32 may move the external air or the internal circulation air passing through the intake door into the vehicle. As a speed of the blower motor 32 becomes faster, the external air or the internal circulation air may also be moved into the vehicle faster.

As illustrated in FIG. 4, the rear fan 40 may be located in the rear side ('B' of FIG. 2) of the vehicle.

The rear fan 40 may suck in the internal circulation air in a suction direction, and may exhaust the internal circulation air in the opposite direction to the suction direction. As a speed of the rear fan 40 increases, the speed at which the internal circulation air is exhausted also increases. The rear fan 40 may be controlled in a situation in which rapid ventilation in the vehicle is required. According to an embodiment, the situation may include a situation in which the number of vehicle occupants is large and the vehicle speed is low, or the indoor temperature of the vehicle is greater than the outdoor temperature due to external parking.

The controller 130 may be implemented by various processing devices such as a microprocessor in which a semiconductor chip capable of performing calculation or execution of various commands is embedded, and the like, and may control an air conditioning control apparatus 100 for a vehicle, according to an embodiment of the present disclosure.

The controller 130 may determine whether an air conditioning mode of the vehicle is in an ON state. When it is determined that the air conditioning mode of the vehicle is in the ON state, the controller 130 may compare the indoor temperature of the vehicle with the outdoor temperature of the vehicle. According to an embodiment, the controller 130 may determine whether the indoor temperature of the vehicle is less than the outdoor temperature of the vehicle.

When it is determined that the indoor temperature of the vehicle is less than the outdoor temperature of the vehicle, the controller 130 may determine the number of vehicle occupants in the vehicle and the vehicle speed.

According to an embodiment, the controller 130 may determine whether the number of vehicle occupants exceeds one. When the number of vehicle occupants exceeds one, the controller 130 may determine whether the number of vehicle occupants is a first number of occupants exceeding at least one. According to an embodiment, the first number of occupants may include two people. In addition, when the number of vehicle occupants does not exceed one, that is, when the number of vehicle occupants is one, the controller 130 may perform the air conditioning control in a conventional manner.

When it is determined that the number of vehicle occupants is the first number of occupants, the controller 130 may determine whether the vehicle speed exceeds a first speed. When the vehicle speed exceeds the first speed, the controller 130 may allow the intake door to increase an amount of air introduced from the outside of the vehicle. According to the embodiment, the controller 130 may control a rotation of the intake door 30 such that the flow passage of the external air introduced from the outside of the vehicle is turned off, so that it is possible to increase the amount of the external air flowing into the vehicle than the amount of the internal circulation air flowing into the vehicle. As described above, the controller 130 may increase the amount of the external air flowing into the vehicle than the amount of the internal circulation air, thereby improving the comfort inside the vehicle.

Meanwhile, when the number of vehicle occupants is the first number of occupants exceeding at least one and the vehicle speed does not exceed the first speed, the controller 130 may allow the intake door to increase the amount of the external air introduced from the outside and may adjust the speed of the blower motor upward (e.g., increase the speed of the blower motor). As such, when the number of vehicle occupants is the first number of occupants and the vehicle speed does not exceed the first speed, a speed of moving the external air into the vehicle may be lower than when the vehicle speed is the first speed. Therefore, when the vehicle speed does not exceed the first speed, the controller 130 may increase the speed of the blower motor so that the external air may quickly move into the vehicle. Accordingly, the controller 130 may improve the comfort inside the vehicle even when the vehicle speed is not greater than the first speed.

When it is determined that the number of vehicle occupants is not the first number of occupants, the controller 130 may determine whether the number of vehicle occupants is a second number of occupants greater than the first number of occupants. In this case, the second number of occupants may include three people.

When it is determined that the number of vehicle occupants is the second number of occupants, the controller 130 may determine whether the vehicle speed exceeds a second speed. In this case, the second speed may mean a speed faster than the first speed.

When the number of occupants in the vehicle increases than the number of first occupants and the vehicle speed increases more than the first speed, the controller 130 may allow the intake door to increase the amount of air introduced from the outside of the vehicle. According to the embodiment, the controller 130 may rotate and open the intake door 30 such that the flow passage of the external air introduced from the outside of the vehicle is opened, and may increase the amount of the external air introduced into the vehicle than the amount of the internal circulation air introduced into the vehicle. Although the number of vehicle occupants increases, as the vehicle speed increases, the speed at which the external air flows into the vehicle is fast. Accordingly, the controller 130 may improve the comfort inside the vehicle only by allowing the external air to flow into the vehicle.

Meanwhile, when it is determined that the number of vehicle occupants is the second number of occupants and the vehicle speed does not exceed the second speed, the controller 130 may allow the intake door to increase the amount of the external air introduced from the outside, may adjust the speed of the blower motor upward, and may control the rear fan at the first reference speed. In detail, since the vehicle speed does not exceed the second speed, the speed of moving the external air into the vehicle may be lower than when the vehicle speed is the second speed. Therefore, when the number of vehicle occupants increases than the first number of occupants and the vehicle speed does not exceed the second speed, the controller 130 may determine that rapid ventilation is required, may adjust the speed of the blower motor upward, and may control the rear fan at the first reference speed, such that the external air flowing in from the outside of the vehicle may rapidly move into the vehicle, and the air inside the vehicle may be rapidly exhausted to the outside. Accordingly, the controller 130 may improve the comfort inside the vehicle even when the number of vehicle occupants increases and the vehicle speed does not exceed the second speed.

When it is determined that the number of vehicle occupants is not the second number of occupants, the controller 130 may determine that the number of vehicle occupants exceeds the second number of occupants.

When it is determined that the number of vehicle occupants exceeds the second number of occupants, the controller 130 may allow the intake door to increase the amount of the external air introduced from the outside, may adjust the speed of the blower motor upward, and may control the rear fan at the second reference speed.

In addition, when it is determined that the indoor temperature of the vehicle is not lower than the outdoor temperature of the vehicle, the controller 130 may determine that the indoor temperature of the vehicle greater than the outdoor temperature of the vehicle, and may determine the situation in which rapid ventilation is required. The controller 130 may allow the intake door to increase the amount of the external air introduced from the outside, may adjust the speed of the blower motor upward, and may control the rear fan at the second reference speed. Accordingly, the controller 130 may improve the comfort inside the vehicle by allowing rapid ventilation even when the indoor temperature of the vehicle is greater than the outdoor temperature of the vehicle.

Figure 5:
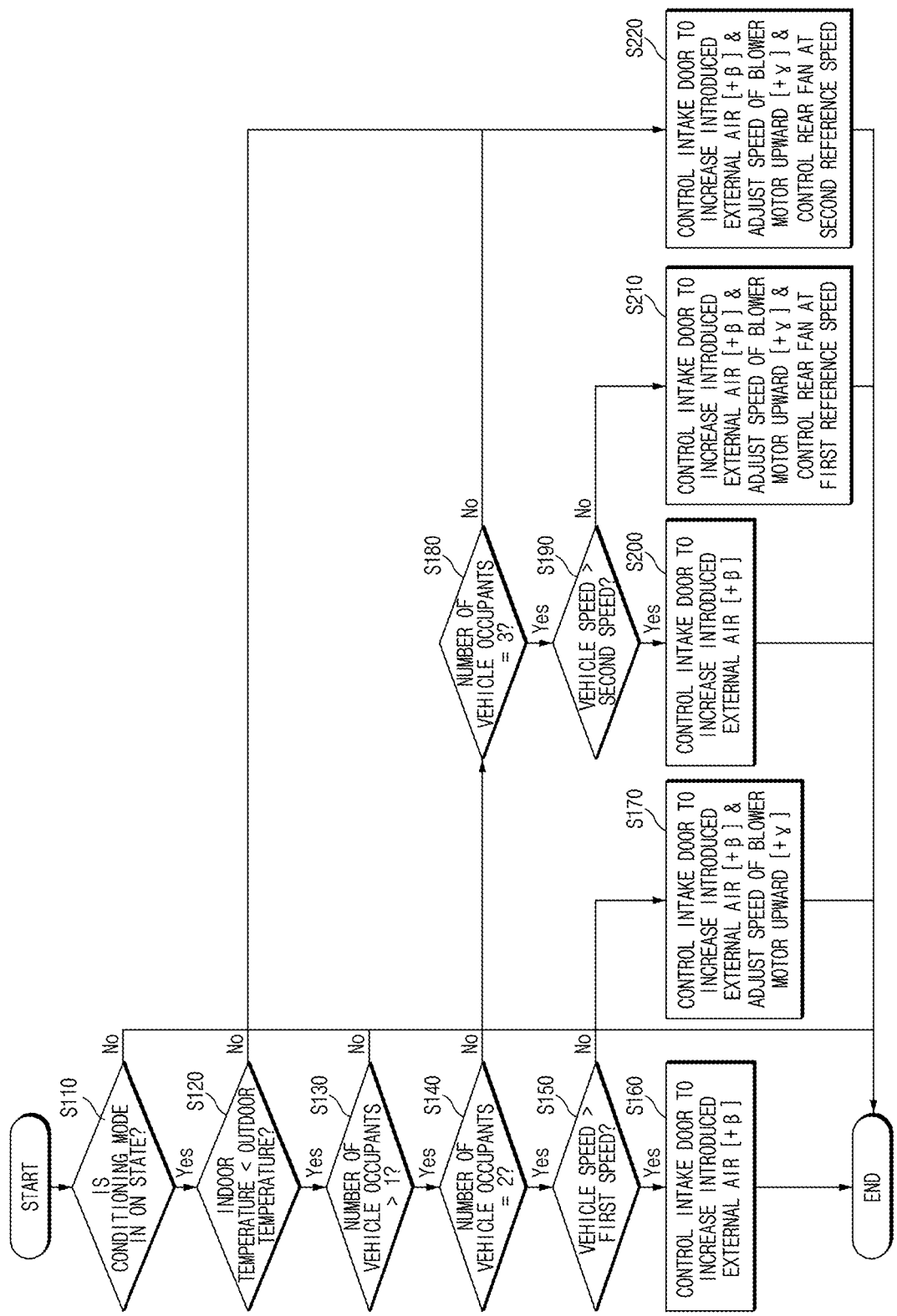
FIG. 5 is a flowchart illustrating an air conditioning control method in a vehicle according to an embodiment of the present disclosure.

FIG. 5 is a flowchart illustrating an air conditioning control method in a vehicle according to an embodiment of the present disclosure.

The controller 130 may determine whether the air conditioning mode of the vehicle is in the ON state (S110).

When it is determined in S110 that the air conditioning mode of the vehicle is in the ON state (Y), the controller 130 may compare the indoor temperature of the vehicle with the outdoor temperature of the vehicle. According to an embodiment, the controller 130 may determine whether the indoor temperature of the vehicle is less than the outdoor temperature of the vehicle (S120).

When it is determined in S120 that the indoor temperature of the vehicle is less than the outdoor temperature of the vehicle (Y), the controller 130 may determine the number of vehicle occupants in the vehicle and the vehicle speed.

According to an embodiment, the controller 130 may determine whether the number of vehicle occupants exceeds one (S130). When the number of vehicle occupants exceeds one (Y) in S130, the controller 130 may determine whether the number of vehicle occupants is the first number of occupants exceeding at least one (S140). According to an embodiment, the first number of occupants may include two people.

When it is determined in S140 that the number of vehicle occupants is the first number of occupants (Y), the controller 130 may determine whether the vehicle speed exceeds the first speed (S150).

When the vehicle speed exceeds the first speed (Y) in S150, the controller 130 may allow the intake door to increase the amount of external air introduced from the outside of the vehicle (S160). According to the embodiment, in S160, the controller 130 may rotate the intake door 30 such that the flow passage of the external air introduced from the outside of the vehicle is opened, and may increase the amount of the external air introduced into the vehicle than the amount of the internal circulation air introduced into the vehicle. As described above, the controller 130 may increase the amount of the external air introduced into the vehicle than the amount of the internal circulation air introduced into the vehicle to improve the comfort inside the vehicle.

In S150, when the vehicle speed does not exceed the first speed (N), the controller 130 may allow the intake door to increase the amount of the external air flowing in from the outside and may increase the speed of the blower motor (S170).

In S140, when it is determined that the number of vehicle occupants is not the first number of occupants (N), the controller 130 may determine whether the number of vehicle occupants is the second number of occupants greater than the first number of occupants (S180). In this case, the second number of occupants may include three people.

In S180, when it is determined that the number of vehicle occupants is the second number of occupants (Y), the controller 130 may determine whether the vehicle speed exceeds the second speed (S190). In this case, the second speed may mean a speed faster than the first speed.

In S190, when it is determined that the vehicle speed exceeds the second speed (Y), the controller 130 may allow the intake door to increase the amount of the external air introduced from the outside of the vehicle (S200). According to the embodiment, in S200, the controller 130 may allow the intake door 30 to be rotated to open the flow passage of the external air introduced from the outside of the vehicle, and may increase the amount of the external air introduced into the vehicle than the amount of the internal circulation air introduced into the vehicle. Although the number of vehicle occupants increases, as the vehicle speed increases, the speed at which the external air flows into the vehicle is fast. Accordingly, the controller 130 may improve the comfort inside the vehicle only by allowing the external air to flow into the vehicle.

In S190, when it is determined that the vehicle speed does not exceed the second speed (N), the controller 130 may allow the intake door to increase the amount of the external air introduced from the outside, may adjust the speed of the blower motor upward, and may control the rear fan at the first reference speed (S210). In detail, in S210, since the vehicle speed does not exceed the second speed, the speed of moving the external air into the vehicle may be lower than when the vehicle speed is the second speed. Therefore, when the number of vehicle occupants increases than the first number of occupants and the vehicle speed does not exceed the second speed, the controller 130 may determine that rapid ventilation is required, may increase the speed of the blower motor, and may control the rear fan at the first reference speed, such that external air flowing in from the outside of the vehicle rapidly moves into the vehicle and the air inside the vehicle is rapidly exhausted. Accordingly, the controller 130 may improve the comfort inside the vehicle even when the number of vehicle occupants increases and the vehicle speed does not exceed the second speed.

In S180, when it is determined that the number of vehicle occupants is not the second number of occupants (N), the controller 130 may determine that the number of vehicle occupants exceeds the second number of occupants.

When it is determined that the number of vehicle occupants exceeds the second number of occupants (N) in S180, the controller 130 may allow the intake door to increase the amount of the external air introduced from the outside, may increase the speed of the blower motor, and may control the rear fan at the second reference speed (S220).

On the other hand, in S120, when it is determined that the indoor temperature of the vehicle is not less than the outdoor temperature of the vehicle (N), the controller 130 may determine that the indoor temperature of the vehicle is greater than the outdoor temperature of the vehicle, and may determine the situation in which rapid ventilation is required. The controller 130 may allow the intake door to increase the amount of the external air flowing in from the outside, may increase the speed of the blower motor, and may control the rear fan at a second reference speed (S220). Accordingly, the controller 130 may improve the comfort inside the vehicle by allowing rapid ventilation even when the indoor temperature of the vehicle is greater than the outdoor temperature of the vehicle.

Figure 6:
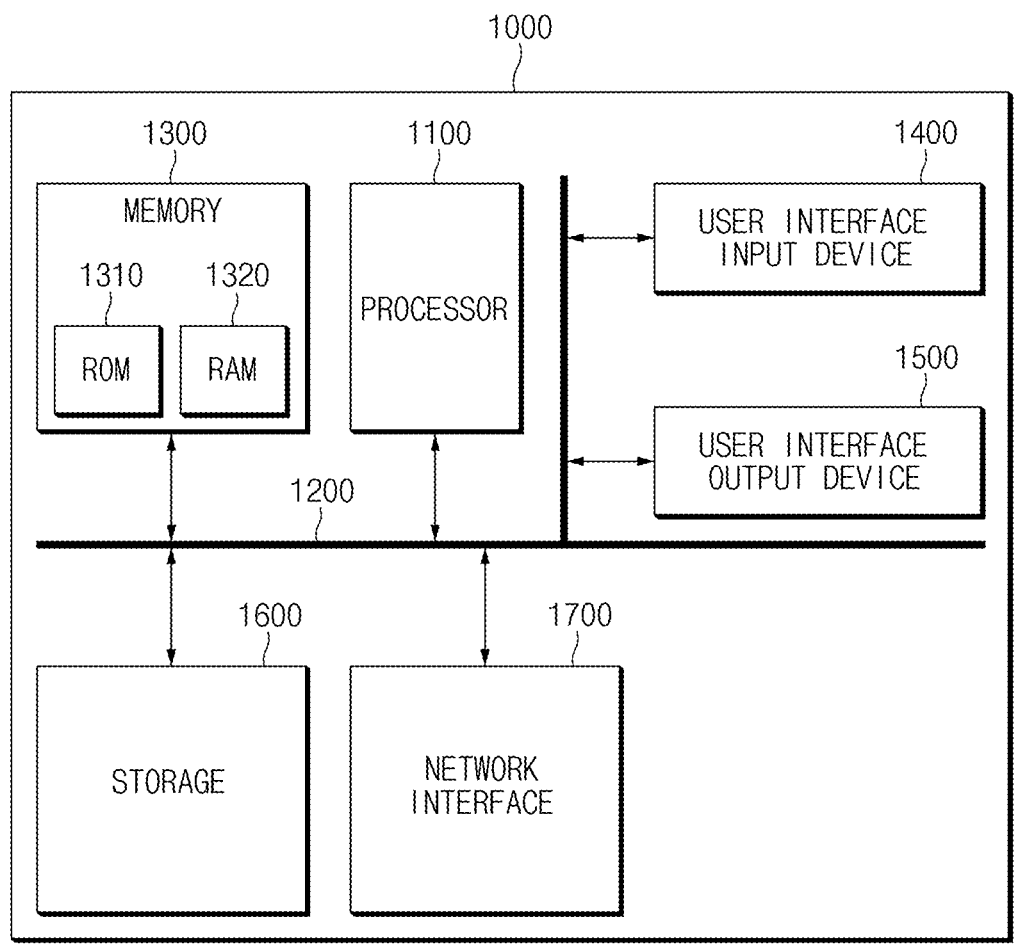
FIG. 6 is a diagram illustrating a configuration of a computing system for executing a method according to an embodiment of the present disclosure.

FIG. 6 is a diagram illustrating a configuration of a computing system for executing a method according to an embodiment of the present disclosure.

Referring to FIG. 6, a computing system 1000 may include at least one processor 1100, a memory 1300, a user interface input device 1400, a user interface output device 1500, storage 1600, and a network interface 1700, which are connected through a bus 1200.

The processor 1100 may be a central processing unit (CPU) or a semiconductor device that executes processing on instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the method or the steps of algorithm described in connection with the embodiments disclosed herein may be implemented directly in hardware, a software module, or a combination of the two, which is executed by the processor 1100. The software module may reside in a storage medium (i.e., the memory 1300 and/or the storage 1600) such as a RAM, a flash memory, a ROM, an EPROM, an EEPROM, a register, a hard disk, a removable disk, and a CD-ROM. The storage medium as an example is coupled to the processor 1100, the processor 1100 may read information from, and write information to, the storage medium. Alternatively, the storage medium may be integrated with the processor 1100. The processor and storage medium may reside within an application specific integrated circuit (ASIC). The ASIC may reside within the user terminal. Alternatively, the processor and storage medium may reside as separate components within the user terminal.

According to the present disclosure, an air conditioning control apparatus for the vehicle and a method thereof may improve comfort inside a vehicle by adjusting the ventilation amount depending on the number of vehicle occupants, the vehicle speed, and the indoor temperature and the outdoor temperature of the vehicle.

The above description is merely illustrative of the technical idea of the present disclosure, and those of ordinary skill in the art to which the present disclosure pertains will be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. An air conditioning control apparatus for a vehicle comprising:
    a sensor configured to sense a number of vehicle occupants, a vehicle speed, and an indoor temperature and an outdoor temperature of the vehicle;
    an air conditioner configured to adjust an amount of external air introduced from an outside of the vehicle or air exhausted to the outside of the vehicle; and
    a controller configured to control the air conditioner based on the number of vehicle occupants, the vehicle speed, and the indoor temperature and the outdoor temperature of the vehicle,
    wherein the controller determines the number of vehicle occupants and the vehicle speed, when it is determined that the indoor temperature of the vehicle is less than the outdoor temperature of the vehicle.

2. The air conditioning control apparatus of claim 1, wherein the air conditioner includes:
    an intake door to adjust a vehicle internal inflow amount of the external air and internal circulation air circulated inside the vehicle;
    a blower motor to move the external air into the vehicle or to move the internal circulation air back into the vehicle; and
    a rear fan to exhaust air inside the vehicle to the outside of the vehicle.

3. The air conditioning control apparatus of claim 2, wherein the controller allows the intake door to increase the amount of the external air, when the number of vehicle occupants is a first number of occupants exceeding at least one, and the vehicle speed exceeds a first speed.

4. The air conditioning control apparatus of claim 2, wherein the controller allows the intake door to increase the amount of the external air, and increases a speed of the blower motor, when the number of vehicle occupants is a first number of occupants exceeding at least one, and the vehicle speed does not exceed a first speed.

5. The air conditioning control apparatus of claim 4, wherein the controller allows the intake door to increase the amount of the external air, increases the speed of the blower motor, and controls a speed of the rear fan at a first reference speed, when the number of vehicle occupants is a second number of occupants greater than the first number of occupants, and the vehicle speed does not exceed a second speed faster than the first speed.

6. The air conditioning control apparatus of claim 5, wherein the controller allows the intake door to increase the amount of the external air, increases the speed of the blower motor, and controls the speed of the rear fan at a second reference speed faster than the first reference speed, when the number of vehicle occupants exceeds the second number of occupants.

7. A method of controlling an air conditioning in a vehicle, the method comprising:
    sensing, by a sensor, a number of vehicle occupants, a vehicle speed, and an indoor temperature and an outdoor temperature of the vehicle;
    determining, by a controller, whether the indoor temperature of the vehicle is less than the outdoor temperature of the vehicle;
    determining, by the controller, the number of vehicle occupants;
    determining, by the controller, the vehicle speed; and
    controlling, by the controller, an air conditioner which adjusts an amount of external air introduced from an outside of the vehicle or air exhausted to the outside of the vehicle, based on the number of vehicle occupants, the vehicle speed, and the indoor temperature and the outdoor temperature of the vehicle.

8. The method of claim 7, wherein the air conditioner includes:
    an intake door to adjust a vehicle internal inflow amount of the external air and internal circulation air circulated inside the vehicle;
    a blower motor to move the external air into the vehicle or to move the internal circulation air back into the vehicle; and
    a rear fan to exhaust air inside the vehicle to the outside of the vehicle.

9. The method of claim 8, wherein the controlling of the air conditioner includes:
    allowing the intake door to increase the amount of the external air, when the number of vehicle occupants is a first number of occupants exceeding at least one, and the vehicle speed exceeds a first speed.

10. The method of claim 8, wherein the controlling of the air conditioner includes:

allowing the intake door to increase the amount of the external air, and increasing a speed of the blower motor, when the number of vehicle occupants is a first number of occupants exceeding at least one, and the vehicle speed does not exceed a first speed.

11. The method of claim 10, wherein the controlling of the air conditioner includes:

allowing the intake door to increase the amount of the external air, increasing the speed of the blower motor, and controlling a speed of the rear fan at a first reference speed, when the number of vehicle occupants is a second number of occupants greater than the first number of occupants, and the vehicle speed does not exceed a second speed faster than the first speed.

12. The method of claim 11, wherein the controlling of the air conditioner includes:

allowing the intake door to increase the amount of the external air, increasing the speed of the blower motor, and controlling the speed of the rear fan at a second reference speed faster than the first reference speed, when the number of vehicle occupants exceeds the second number of occupants.

\* \* \* \* \*